US006848043B1

(12) United States Patent
Yeh et al.

(10) Patent No.: US 6,848,043 B1
(45) Date of Patent: Jan. 25, 2005

(54) OPTIMAL REDUNDANT ARITHMETIC FOR MICROPROCESSORS DESIGN

(75) Inventors: Thomas Y. Yeh, Cupertino, CA (US); Hong Wang, Fremont, CA (US); Ralph Kling, Sunnyvale, CA (US); Yong-Fong Lee, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/561,261

(22) Filed: Apr. 27, 2000

(51) Int. Cl.[7] .................................................. G06F 9/30
(52) U.S. Cl. ........................................ 712/216; 712/221
(58) Field of Search ................................. 712/215, 216, 712/217, 221; 708/510

(56) References Cited

U.S. PATENT DOCUMENTS

| | | | |
|---|---|---|---|
| 4,878,192 A | | 10/1989 | Nishiyama et al. |
| 5,243,551 A | | 9/1993 | Knowles et al. |
| 5,619,664 A | * | 4/1997 | Glew ........................... 712/218 |
| 5,751,619 A | | 5/1998 | Agarwal et al. |
| 5,790,826 A | * | 8/1998 | Thusoo et al. ............... 712/216 |
| 5,799,182 A | * | 8/1998 | Gravenstein et al. ........ 712/245 |
| 5,815,420 A | | 9/1998 | Steiss |
| 5,884,059 A | * | 3/1999 | Favor et al. ................. 712/215 |
| 5,887,174 A | * | 3/1999 | Simons et al. .............. 717/161 |
| 5,889,999 A | * | 3/1999 | Breternitz et al. ........... 717/158 |
| 5,944,816 A | * | 8/1999 | Dutton et al. ............... 712/215 |
| 5,974,538 A | * | 10/1999 | Wilmot, II ................... 712/218 |
| 6,038,657 A | * | 3/2000 | Favor et al. ................. 712/216 |

OTHER PUBLICATIONS

T. Irita, T. Ogura, K. Hoh, and M. Fujishima, "Microprocessor Architecture Utilizing Redundant–Binary Operation", Systems & Computers in Japan, vol. 30, No. 13, 1999, School of Engineering, University of Tokyo, Tokyo, Japan 113–8656 pp. 106–115, Koichiro Hoh VLSI Design & Education Center (VDEC) University of Tokyo, Tokyo, Japan 113–8656, Translated from Denshi Joho Tsushin Gakkai Ronbunshi, vol. J81–D–I, No. 2, Feb. 1998, pp. 94–103.
H.R. Srinivas, and K.K. Parhi, "Computer Arithmetic Architectures With Redundant Number Systems", 1994 Conference Record of The Twenty–Eighth Asilomar Conference on Signals, Systems & Computers on vol.: 1, 1994, Dept. of Electrical Engineering University of Minnesota, Minneapolis, MN 55455 pp. 182–186.

* cited by examiner

Primary Examiner—Henry W. H. Tsai
(74) Attorney, Agent, or Firm—David N. Tran

(57) ABSTRACT

Methods and apparatus for improving system performance using redundant arithmetic are disclosed. In one embodiment, one or more dependency chains are formed. A dependency chain may comprise of two or more instructions. A first instruction may generate a result in a redundant form. A second instruction may accept the result from the first instruction as a first input operand. The instructions in the dependency chain may execute separately from instructions not in the dependency chain.

15 Claims, 17 Drawing Sheets

OPTIMAL REDUNDANT ARITHMETIC FOR MICROPROCESSORS DESIGN

FIELD OF THE INVENTION

The present invention relates generally to the field of processor design. More specifically, the present invention is directed to a method of and apparatus for implementing redundant arithmetic to enhance system performance.

BACKGROUND

As software applications become more complex, hardware designers try to come up with different approaches to improve the performance of the system. Hardware circuits are limited by their physical hardware that affects practical logic designs. One of the important limitations is the fact that a real logic element cannot respond instantaneously to a change of signals on its inputs. There is a finite period of time after the input signal changes before the output signal will change. This time delay is dependent upon the type of circuit used, the number of inputs, and the specific geometry and physical composition of each specified component in a circuit.

One of the areas of the hardware that experiences the delay is the computation processing functions in the arithmetic logic unit (ALU) of the processor. FIG. 1A illustrates an exemplary full adder 100. The full adder 100 adds the three bits $A_0$, $B_0$ and Carry-in ($C_{in}$) together and produce a sum bit $S_0$ and a Carry-out ($C_0$). FIG. 1B illustrates the most basic type of carry propagate n-bit adder (CPA), the carry-ripple adder, implemented using n cascaded full adders. The result is all the sum bits ($S_0, S_1, \ldots, S_{n-1}$) with one sum bit per result position (0 to n−1), where n is the number of bits per add operand. The carry-out bit $C_0$ from the first full adder is propagated to the second full adder, etc. The carry-out bit $C_1$ from the second full adder must wait for the carry-out bit $C_0$ bit from the first full adder, etc. The wait time at each adder is a propagated time delay ($t_{pd}$). Thus, for the n-bit adder, the total time delay is $nt_{pd}$. This propagated time delay $t_{pd}$ for the output signals to be available provides a bottleneck for the speed performance of the adder, especially if the numbers to be added are longer in length. There are various carry propagate adders to speed up the execution of the add and subtract opertions. Some of these include carry skip, carry select, carry look ahead, and complex hybrid implementations. All CPAs suffer from increased delay due to increased precision of the operation.

One scalable approach to reduce the execution time is to implement redundant arithmetic. With redundant arithmetic implementation, each position's adder in FIG. 1B is not chained to the previous adder. Each adder performs the addition without having to wait for the carry out ($C_{out}$) bit from the previous adder. Each result position is represented by two bits, the sum bit and the $C_{out}$ bit from the previous full adder. This is referred to as a redundant form as compared to the conventional form where there is one bit per result position. Only selected instructions can operate with redundant operands. Thus, an operand in the redundant form needs to be converted back to the conventional form with one bit per position for the instructions that require the conventional operands. Generally, an optimal carry propagate adder is used to convert the redundant form into the conventional form. Using the redundant arithmetic does not necessarily produce faster execution. The execution delay may increase when the redundant processing is always performed before the resulting operand is converted back to the conventional form. For example, the redundant addition of two conventional operands producing a redundant result can increase the delay when a next scheduled instruction requires an input operand in the conventional form instead of the redundant form.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIGS. 10A, 10B, 10C and 10D illustrate exemplary subtraction operations using the extended carry save format.

DETAILED DESCRIPTION

Figure 1A:
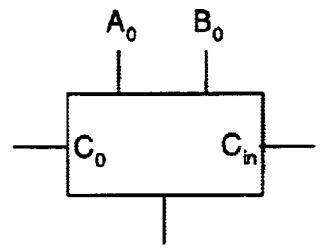
FIGS. 1A and 1B illustrate an exemplary prior full adder.
Figure 1B:
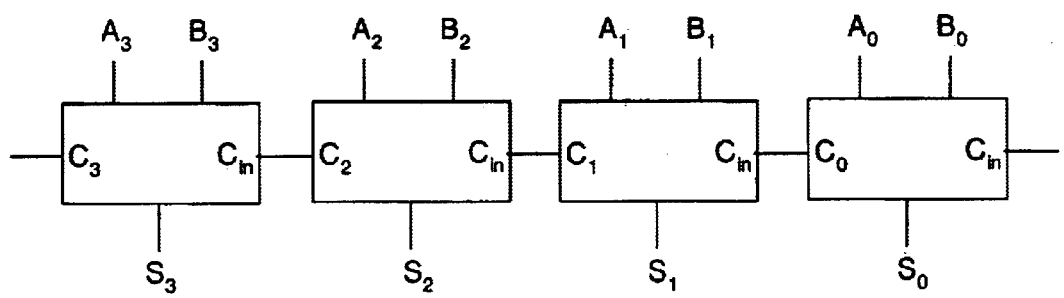

A method and apparatus for improving system performance using redundant arithmetic are disclosed. In the following description, for purposes of explanation, specific nomenclature is set forth to provide a thorough understanding of the present invention. However, it will be apparent to one skilled in the art that these specific details are not required in order to practice the present invention.

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Some portions of the detailed descriptions that follow are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of processes leading to a desired result. The blocks are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method. The required structure for a variety of these systems will appear from the description below. In addition, the present invention is not described with reference to any particular programming language. It will be appreciated that a variety of programming languages may be used to implement the teachings of the invention as described herein.

Figure 2A:
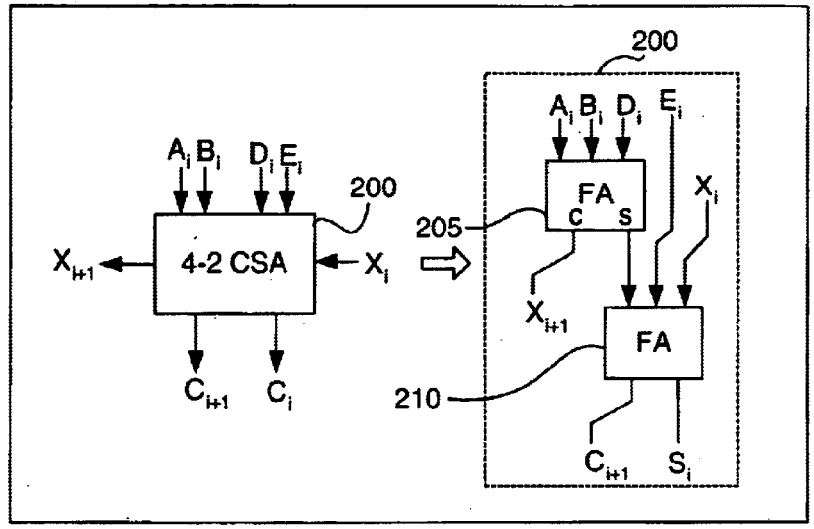
FIGS. 2A and 2B illustrate an exemplary prior implementation of redundant adders in carry-save representation.

FIG. 2A illustrates an exemplary representation of a prior one bit redundant adder implemented with 42 carry-save adders. The 4-2 carry save adder is implemented with two full adder arrays, the top full adder array 205 and the bottom full adder arrays 210. The carry save adder 200 can compress five inputs of the same weight or bit position to three outputs of different weights. For example, referring to FIG. 2A, the five inputs $A_i$, $B_i$, $D_i$, $E_i$, and $X_i$ have the same weight or bit position. The two outputs $S_i$, and $C_{i+1}$ have different weight. The signal $X_{i+1}$ is an intermediate carry that travels one position to the left.

Figure 2B:
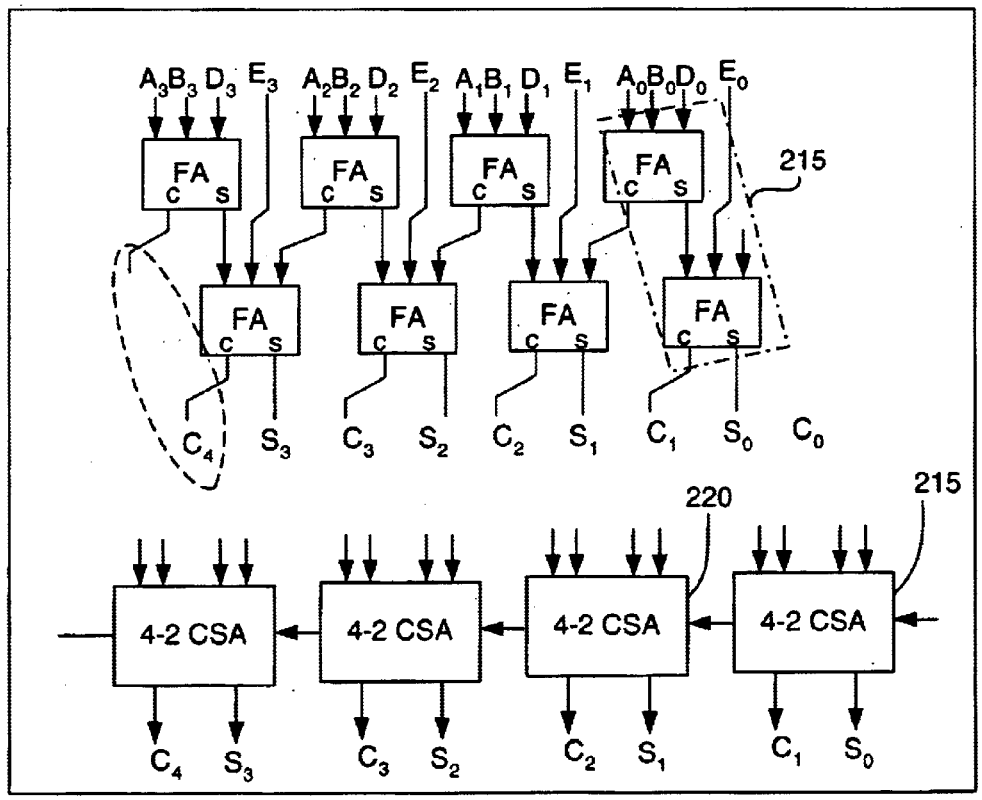

FIG. 2B illustrates an exemplary representation of prior 4 bit redundant adder. In this exemplary representation, there are four bit positions (0 to 3). The full adder 215 generates the least significant sum bit $S_0$ and the carry out bit $C_1$. The full adder 220 generates the next least significant sum bit $S_1$ and the carry out bit $C_2$, etc. The input bits A (bits $A_0$ to $A_3$) and the input bits B (bits $B_0$ to $B_3$) correspond to the sum bit vector and the carry bit vector for the first operand. Similarly, the input bits D (bits $D_0$ to $D_3$) and the input bits E (bits $E_0$ to $E_3$) correspond to the sum bit vector and the carry bit vector for the second operand. The redundant result includes the sum bit vector S (bits $S_0$ to $S_3$) and the carry bit vector C (bits $C_1$ to C4). The carry bit $C_4$ is the overflow bit. The $C_0$ bit is the carry bit for the adder 215.

Figure 3:
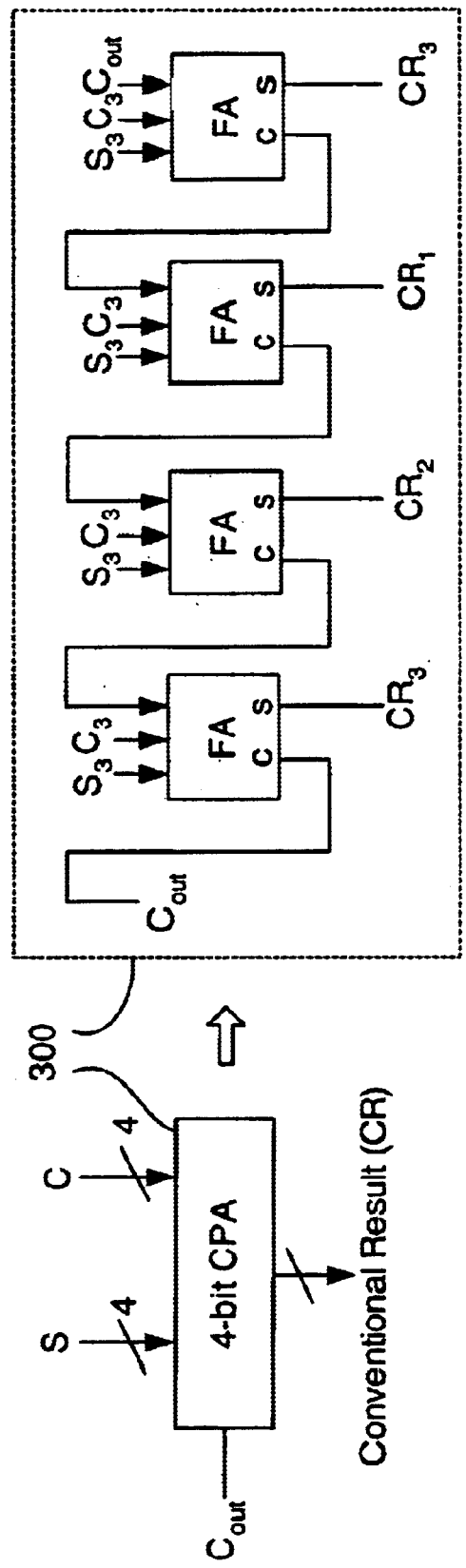
FIG. 3 illustrates an exemplary prior carry propagated adder used as a converter.

FIG. 3 illustrates an exemplary representation of a prior carry propagate adder. The input to the 4-bit carry propagate adder (CPA) 300 is in the redundant form and comprises of a sum bit vector S and a carry bit vector C. The CPA 300 may be used to convert the result in the redundant form to the conventional result (CR) in the conventional form. The conventional result is required by instructions that do not operate with operands in the redundant form.

Redundant arithmetic can be used for add/subtract, compare, memory and instruction address calculations, etc. Generally, when a system implements redundant arithmetic, the redundant operations are performed without regarding the instruction type of the next scheduled instruction. This may cause unnecessary delay when the next scheduled instruction can only operate with an operand in the conventional form. Furthermore, when an instruction has two or more input operands, the format of the operands may be in one of the three different combinations such as, for example, all conventional, some redundant and some conventional, or all redundant. Even though the instruction remains the same, each combination of operands may lead to a different execution time.

A method of and an apparatus for implementing redundant arithmetic to improve processing performance are disclosed. In one embodiment, redundant processing effectively splits the operations into finer partitions, and the redundant values are essentially the intermediate results of these operations. Performance improvement is obtained by eliminating the unnecessary conversions back to the conventional results before starting the dependent operations.

Figure 4:
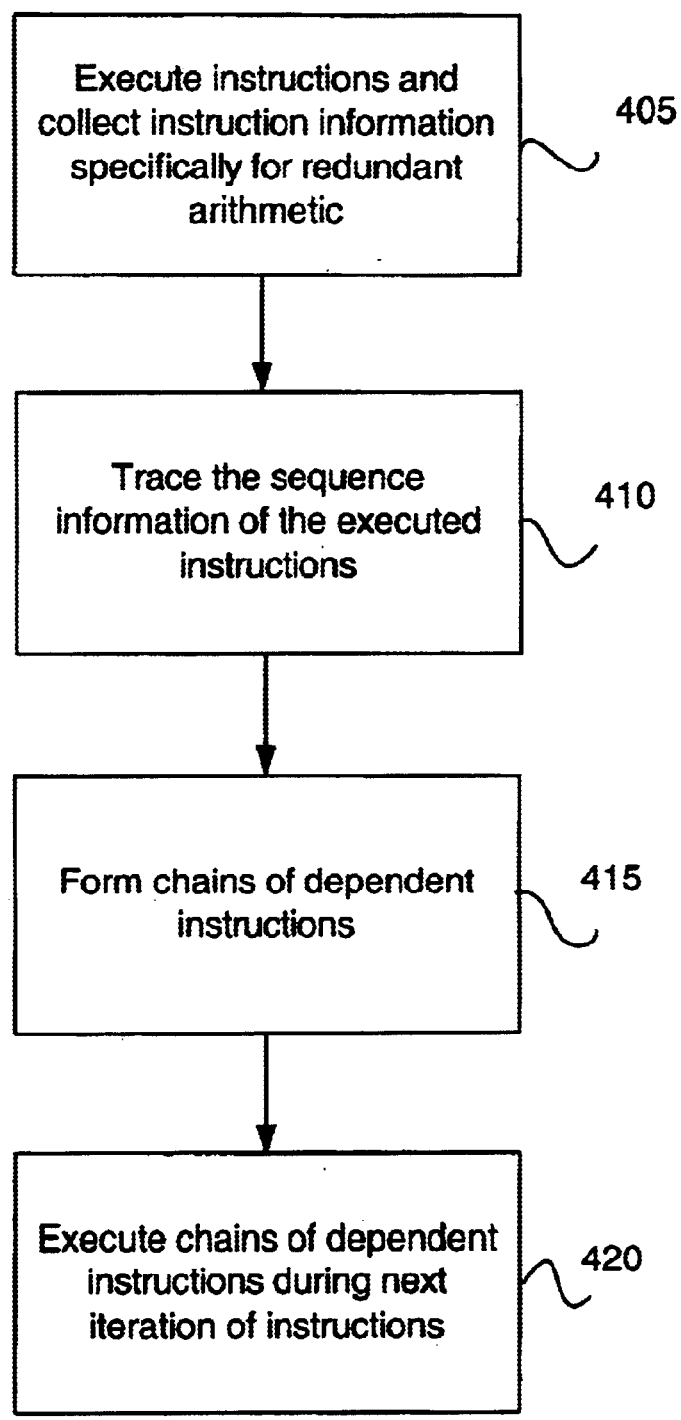
FIG. 4 illustrates an exemplary flow diagram of one embodiment of the technique disclosed.

In one embodiment, the redundant operands generated by the executed instructions are detected. The redundant operands and their associated instructions are used to form the dependency chains. FIG. 4 is an exemplary flow diagram illustrating one embodiment of this method. In block 405, as each instruction is retrieved from the main instruction pipeline and executed for the first time, the information specific to redundant arithmetic optimization is collected and stored in the memory. The information includes the instruction type, the format of the operands, and the format of the result.

In block 410, as each instruction is executed, a trace sequence information of the instruction sequence is kept so that the dependency chains can be formed. For example, the trace sequence information may include instructions that share the same operand. In one embodiment, the dependency chain comprises of instructions that can accept the redundant result of a previous instruction as its input operand. In block 415, based on the trace sequence information and the information about the instruction type, one or more dependency chains are formed. For example, the first instruction is A=B+C, and the second instruction is E=D+A. The redundant result A from the first instruction is used as the input operand for the second instruction. In one embodiment, the operand D of the second instruction may be in the redundant form or in the conventional form. Thus, in this example, the dependency chain includes the first instruction and the second instruction.

It would be appreciated by one skilled in the art that that there may be situations when the previous instruction in the above example may not be the most immediate previous instruction. For example, the first instruction is A=B+C, the second instruction is F=D+E, and the third instruction is G=H+A. The redundant result A in the first instruction is also used as the input operand for the third instruction. Thus, in this example, the dependency chain includes the first instruction and the third instruction. The third instruction is referred to as the dependent instruction because it depends on the first instruction for its input operand.

The instruction may have one or more input operands. In one embodiment, the dependent instruction needs to be able to accept the input operand in the redundant form. This allows the dependent instruction to take advantage of the timesaving resulting from the redundant arithmetic. In another embodiment, when the dependent instruction can accept multiple input operands, the dependency chain allows the execution of the previous instruction in the dependency chain to be bypassed. For example, considering the above instruction sequence A=B+C, F=D+E and G=H+A, the add operation B+C in the first instruction may be bypassed and the operands B and C may be used as the input operands for the last instruction. The last instruction is the dependent instruction. In this example, the input operands for the dependent instruction are H, B and C.

The first instruction in a dependency chain operates with its input operands in the conventional form. For example, the first instruction in the dependency chain may accept its input operands from the registers in the conventional form. The result of the first instruction is in the redundant form. The second instruction in the same dependency chain then accepts the result of the first instruction as its input operand.

In block 420, the instructions in each dependency chains are executed. In one embodiment, the dependency chains are stored and executed from a separate pipeline (daughter pipeline) other than the main instruction pipeline. By chaining the instructions in the dependency chains where each instruction can operate with redundant operands, the extra conversions can be reduced. By speeding up the instructions on the critical path, performance can be improved.

In one embodiment, in order to take advantage of the redundant operations, the daughter pipeline may need to be able to examine four levels of dependent instructions. In another embodiment, two carry propagate adders may be required for one redundant adder to convert the results to the conventional form in parallel. The conversions may be pipelined with one carry propagate adder.

Figures 5A, 5B:
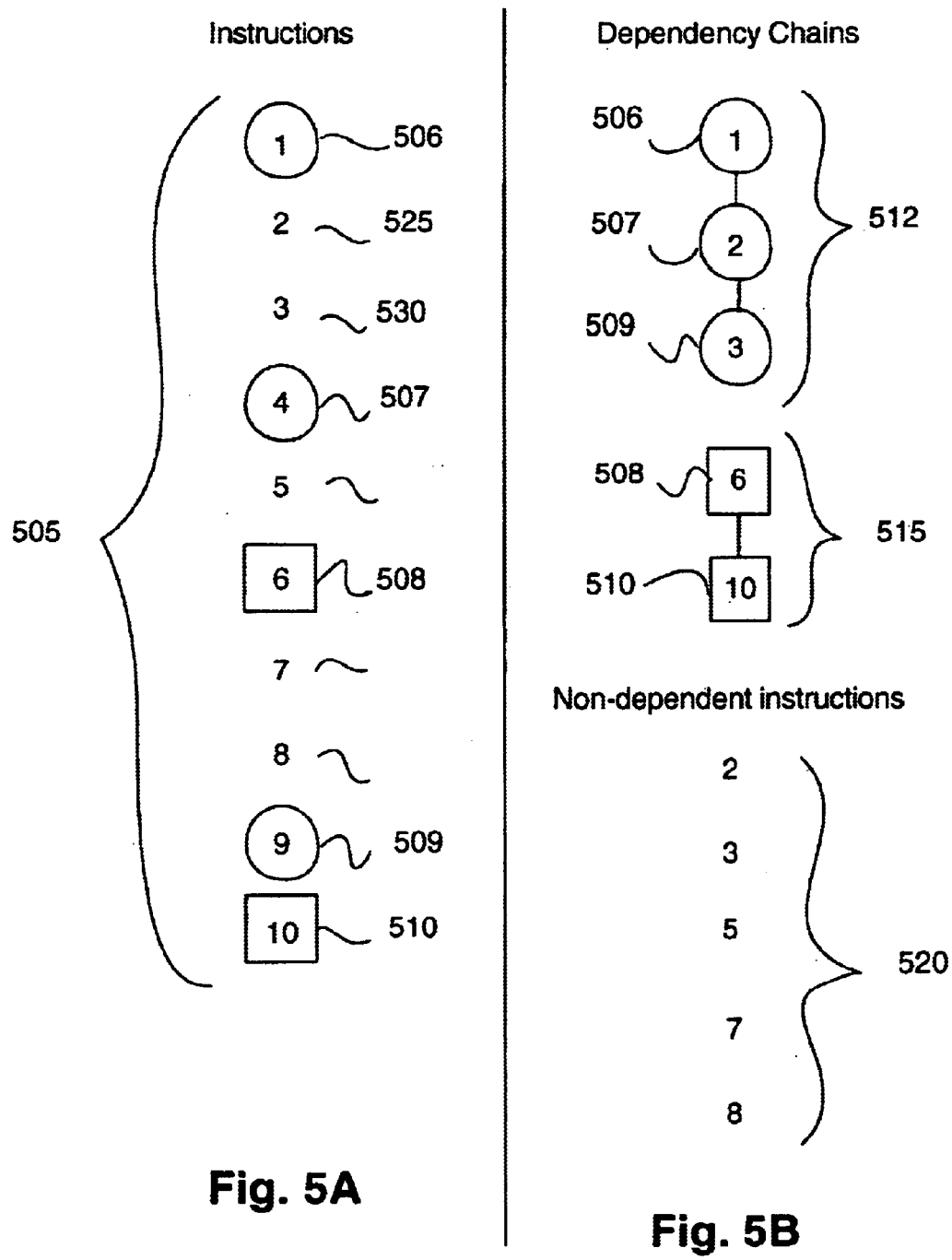
FIG. 5A illustrates an exemplary representation of a sequence of instruction comprising of dependent and non-dependent instructions.
FIG. 5B illustrates an exemplary representation of one embodiment of dependency chains.

In one embodiment, performance of redundant arithmetic can be improved with the scheduling of the instructions in the dependency chains. FIG. 5A illustrates an exemplary set of instructions corresponding to an exemplary code section of a program. Each number from one to ten represents one instruction in a sequence of ten instructions. The instruction group 505 represents the normal sequence of instructions scheduled to be executed starting with the first instruction. In this exemplary instruction sequence, the fourth instruction 507 is dependent on the first instruction 506. The ninth instruction 509 is dependent on the fourth instruction 507. The instructions 506, 507 and 509 form one dependency chain. Similarly, the tenth instruction 510 is dependent on the sixth instruction 508 and together they form another dependency chain. In the normal execution sequence, the instruction group 505 would be executed in sequence from the first instruction 506 to the tenth instruction 510. Although the second instruction 525 and the third instruction 530 are not dependent on the first instruction 506, their execution takes cycle times between the first instruction 506 and the fourth instruction 507. By the time the fourth instruction 507 is executed, it does not matter if the redundant arithmetic was used in the first instruction 506. This is because by the time the fourth instruction 507 is scheduled, the redundant result from the first instruction 506 is already converted to the conventional form. Therefore, in the normal execution sequence, using redundant arithmetic for the first instruction 506 does not add any performance benefit. It would be appreciated to one skilled in the art that the flow of FIG. 5 is a simplified example and is used to demonstrate one embodiment of the method disclosed.

FIG. 5B illustrates an exemplary representation of one embodiment of the dependency chains. The instruction group 512 represents the first dependency chain. The top of the chain is the first instruction 506. The bottom of the chain is the ninth instruction 509. The first dependency chain also contains the fourth instruction 507. The instruction group 515 represents the second dependency chain with the top being the sixth instruction 508 and the bottom being the tenth instruction 510. The instruction group 520 contains the remaining instructions from the instruction group 505 and includes the instructions that are not dependent on any other instructions.

In one embodiment, the processing performance can be improved by scheduling the dependency chains separately from the non-dependent instructions. For example, referring to FIG. 5B, the first dependency chain in the instruction group 512 may be scheduled separately from the second dependency chain in the instruction group 515. Both dependency chains 512 and 515 may be scheduled separately from the non-dependent instructions in the instruction group 520. For example, each chain can be executed sequentially in a separate thread from the main execution of the instructions not in the dependency chains. This way, the benefit of redundant arithmetic can be exploited to provide additional performance advantage. Although there are different processing implementations, it would be apparent to one skilled in the art that performance can be improved by using the redundant operand dependency chain method without departing from the scope of the invention.

Figure 6:
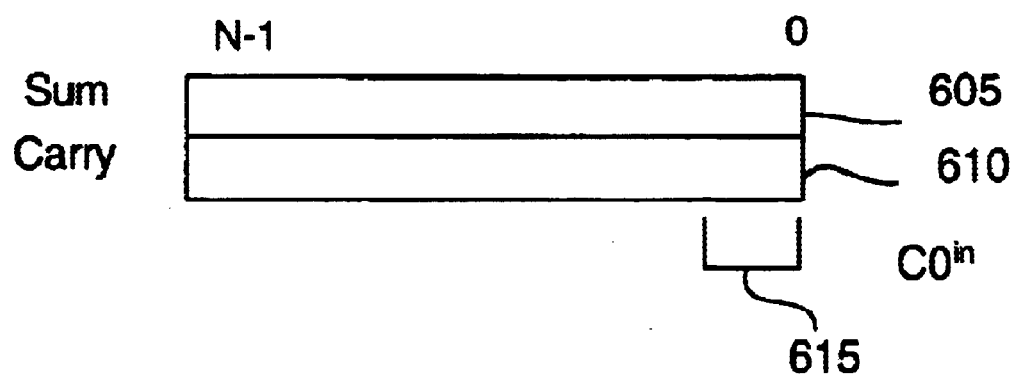
FIG. 6 illustrates an exemplary extended carry-save representation of a redundant form.

FIG. 6 illustrates an exemplary extended carry-save representation of a redundant form that may be used with one embodiment of the method being disclosed. Generally, the redundant form of a carry save consists of a sum bit vector and a carry bit vector. For each bit position, there is a corresponding sum bit and carry bit. With the extended carry save format shown in FIG. 6, an extra bit is required to capture the correct value of the operand. In one embodiment, a radix-2 extended carry-save format is used because it allows for fast addition and because addition operation makes up a large percentage of the executed instructions. The extended carry-save format has a sum bit vector 605, a carry bit vector 610 and the extra bit 615. With the extended carry save format, all add and subtract operations are handled differently. The value of the bit 615 in the $0^{th}$ bit position may be inferred from the instruction type for addition or subtraction operation. For example, when the instruction is the addition, the value of the bit 615 is a zero, and when the instruction is the subtraction, the value of the bit 615 is a one.

The bit position indices used here may be different from other formats. For example, the indices are based on the weight of the signal: $0=2^0$, $1=2^1$, $2=2^2$, and etc. The carry bits are indexed by $C_{in}$ indices and not shifted by one as the conventional $C_{out}$ indices. The bit $C_0$ is the carry bit at position 0 not 1. Mathematically, 2's complement bit vectors have the following weights at each bit position (n equals the number of bits for the precision)$-2^{n-1} \ldots 2^3 2^2 2^1 2^0$. The value of a 2's complement number is determined by $-2^{n-1}An-1+ \ldots 2^3A^3+2^2A^22^1A^1+2^0A^0$. Therefore, addition involves adding the sum of the 2 bit vectors as shown:

$$-2^{n-1}A_{n-1}+ \ldots 2^3A_3+2^2A_2+2^1A_1+2^0A_0 +-2^{n-1}B_{n-1}+ \ldots 2^3B^3+2^2B_2+2^1B_1+2^0B_0$$

When applying the traditional redundant arithmetic on two input operands in the conventional forms, the following results:

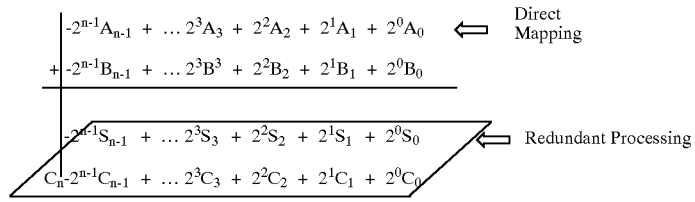

The dashed parallelogram encloses the result bits of the redundant addition. The vertical dashed line marks the statically determined n precision of the values. In one embodiment, the $C_n$ bit is discarded and there is no value for the C bit.

Figure 7A:
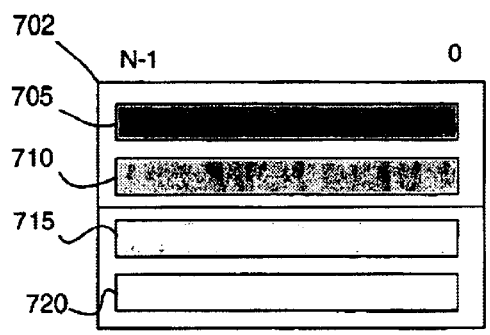
FIGS. 7A, 7B and 7C are simplified representations of exemplary compressions using the redundant form.

FIG. 7A is a simplified representation of an instruction sequence that can be compressed using the redundant adder. In one embodiment, the compression applies to a 4-2 adder (compressor) array used as the redundant adder adding four bit vectors. Each shaded rectangle in FIG. 7A represents one bit vector in the extended carry save format. Each bit vector has n bits. Each enclosed box 702 represents one operation. The operation may be an addition or a subtraction. There are three operations in this representation, the first operation on the top two bit vectors 705 and 710, the second operation on the bottom two bit vectors 715 and 720, and the third operation involves the results of the first operation and the second operation. The executions of the three operations can be compressed into one cycle using a redundant adder. For example, each of the top two bit vectors can be associated with an operand in the conventional form. Each of the bottom two bit vectors can be associated with an operand in the conventional form. Using the 4-2 compressor, the addition of the top two bit vectors is performed by the top full adder and the addition of the bottom two bit vectors is performed by the bottom full adder.

Figure 7B:
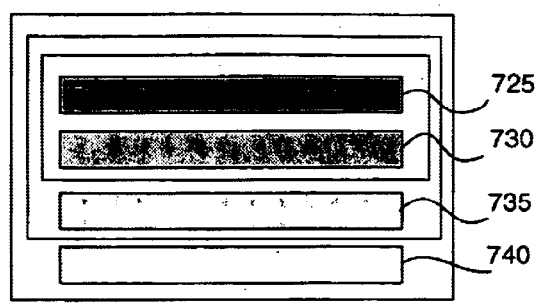

FIG. 7B is another simplified representation of an instruction sequence that can be compressed using the redundant adder. Each rectangle represents a bit vector. There are three consecutive operations in this representation. The first operation uses the two input operands 725 and 730. The second operation uses the result of the first operation and the bit vector 735. The third operation uses the result of the second operation and the bit vector 740. In one embodiment, the executions of these three operations are compressed into one operation using one redundant adder and the extended carry save formats for the operands. For example, the four bit vectors 725, 730, 735 and 740 can be used to represent the four operands in the conventional form and the four bit vectors can be added using one redundant adder.

Figure 7C:
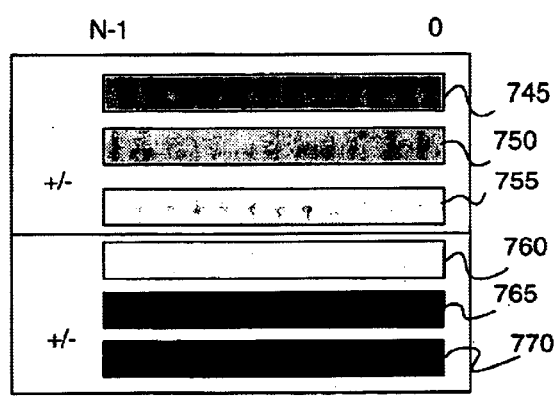

FIG. 7C is another simplified representation of an instruction sequence that can be compressed using the redundant adder. Each of the rectangles represents a bit vector. The top three rectangles 745, 750 and 755 represent the bit vectors corresponding to the operands in a first dependency chain. The bottom three rectangles 760, 765 and 770 represent the bit vectors corresponding to the operands in a second dependency chain. The operations associated with the second dependency chain are independent from the operations associated with the first dependency chain. In this case, both dependency chains can be executed in parallel by compressing their operations using one adder. For example, the first dependency chain can include the instructions A+B=C and C+D=E. The operands A, B and D are represented by the bit vectors 745, 750 and 755. The two add operations may be compressed into one addition and processed by one full adder array. The second dependency chain can include the instructions V+W=X and X+Y=Z. The operands V, W and Y can be represented by the bit vectors 760, 765 and 770. The execution of the second dependency chain is similar to that of the first dependency chain in that the two operations can be compressed into one addition and processed by one full adder array.

Figure 7D:
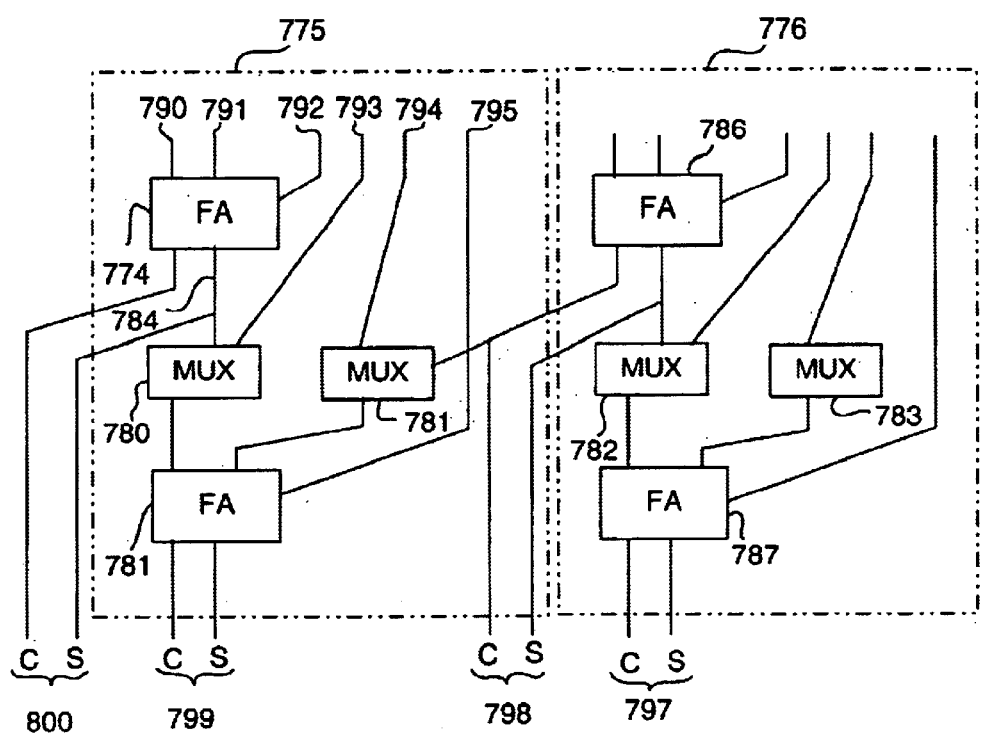
FIG. 7D is an exemplary illustration of one embodiment of the redundant adder arrays with the multiplexor.

In one embodiment, the 4-2 redundant adder may be viewed as two 3-2 adders, the top adder and the bottom adder. This may require modifying the 4-2 adder to accept the additional input signals. In one embodiment, two two-input multiplexors are inserted between the two redundant adder arrays. FIG. 7D is an exemplary illustration of one embodiment of the redundant adder arrays with the multiplexors. There are two bit positions 773 and 776 being illustrated in FIG. 7D. The intermediate signal 784 between the two adder cells 774 and 775 is supplied to the multiplexor 780. Normally, the intermediate signal 784 is sent directly to the full adder 775 by the multiplexor 780. However, when the top operation and the bottom operation are independent from each other, as illustrated in FIG. 7C, the intermediate signal 784 is not sent to the full adder 775. In this situation, the full adder 775 may be used to accept another bit vector for a different add operation. For example, the multiplexor 780 is used to send another input operand 793 to the full adder 775 so that the adder 775 can be used to process the add operation corresponding to the second dependency chain illustrated in FIG. 7C. Using the multiplexor 780 to send another signal 793 to the second full adder 775 allows the top layer of full adders 774 and 786 to perform one add operation while allowing the bottom layer of full adders 775 and 787 to perform another add operation. The four pair of bits 797, 798, 799 and 800 represents the redundant result of each of the four full adders 786, 787, 774 and 775. Using this approach, six different bit vectors 790, 791, 792, 793, 794 and 795 may be added by one adder in one cycle. Performance can be improved since multiple dependent and independent instructions can be compressed into one operation during one cycle time.

Figure 8:
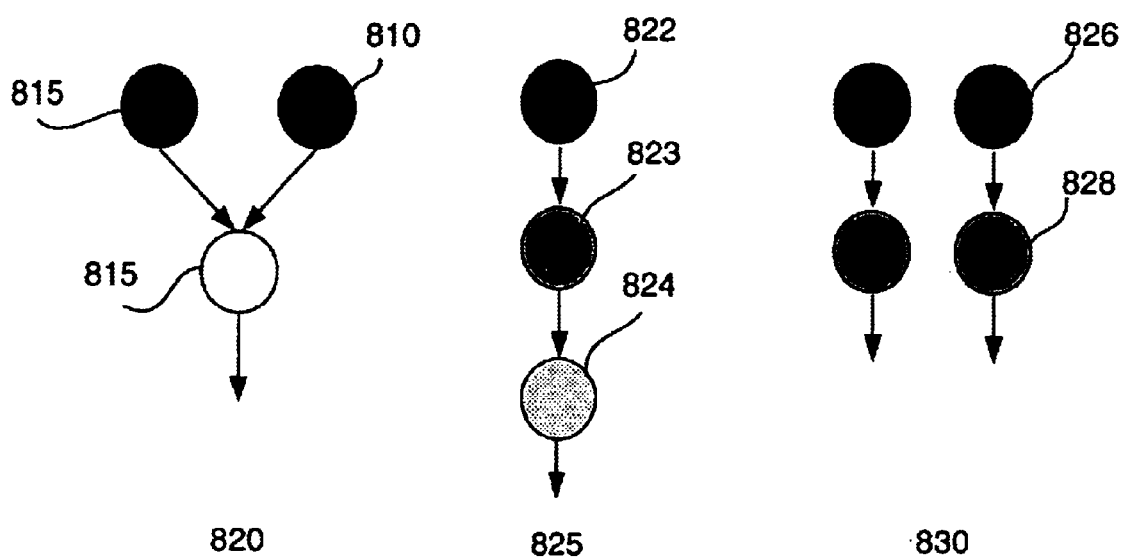
FIG. 8 illustrates exemplary scenarios where multiple instructions can be executed in one cycle.

FIG. 8 illustrates exemplary scenarios where multiple operations can be executed in one cycle. The operations associated with the scenarios 820, 825 and 830 can be executed in one cycle using the exemplary redundant adder illustrated in FIG. 7D. Each circle represents an instruction.

The fully shaded circle represents an instruction having the input operands in the conventional form. The non-shaded circle represents an instruction having the two input operands in the redundant form. The light shaded circle represents an instruction having one input operand in the redundant form and one input operand in the conventional form.

In the scenario 820, there are two independent instructions 805 and 810 each having the input operands in the conventional form. The results of the instructions 805 and 810 are in the redundant form. The instruction 815 depends on the instructions 805 and 810. The two results are used as the input operands by the instruction 815. For example, the instruction 805 can be A+B=C, the instruction 810 can be X+Y=Z, and the instruction 815 can be C+Z=D where C and Z are in the redundant form. Normally, the instructions 803, 810 and 815 are executed in sequence. Since the input operands of the instruction 805 and 810 are in the conventional form, each input operand may be represented by one bit vector. Furthermore, since the redundant adder can add four bits per position, all three operations can be performed in one cycle. For example, the two input operands (bit vectors) associated with the instruction 805 and one input for the instruction 810 can be added by the top full adder. The resulting sum bit from the first adder is passed through the multiplexor and is added to the second input for the instruction 810 by the bottom full adder. Thus, the three operations 805, 810 and 815 can be performed in one cycle by adding four bit vectors. The scenario 820 is similar to the representation illustrated in FIG. 7A.

In the scenario 825, the instruction 822 generates a result in the redundant form. The instruction 823 accepts one input operand from the instruction 822. The instruction 823 generates a result in the redundant form. The instruction 824 accepts that result as its input operand. The conventional form input operands of the instructions 822, 823 and 824 can be added in one cycle. For example, the instructions 822, 823 and 824 can be A+B=C, C+D=F and F+G=H, with the input operands A, B and G in the conventional form, and the input operands C and F in the redundant form. The conventional form input operands A, B, D and G can be represented by three bit vectors. In this example, the bit vectors corresponding to the input operands A, B, D can be added by the top full adder. G and the two bit vectors corresponding to the F operand can be added by the bottom fill adder. The sum and carry bits of the top full adder is passed through the multiplexor and is added by the bottom full adder. This allows the three instructions to be added in one cycle. The scenario 825 is similar to the representation illustrated in FIG. 7B.

In the scenario 830, there are two dependency chains independent of each other with each chain having two instructions. The instruction 828 accepts the input operand in the redundant form from the instruction 826. For example, the first dependency chain may contain the instructions A+B=C and C+D=E, and the second dependency chain may contain the instructions F+G=H and H+J=K. There are six operands or six bit vectors being added in this example including A, B, D and F, G and J. The operands are in the conventional form and each operand is represented by one bit vector. Using the redundant adder illustrated in FIG. 7D, the above four add instructions can be performed in one cycle by adding the six bit vectors. For example, the three operands associated with the first dependency chain can be added by the top full adder. Similarly, the three operands associated with the second dependency chain can be added by the bottom full adder. The multiplexor is configured to pass the bit corresponding to one of the operand in the second dependency chain to the bottom full adder. The results of the two dependency chains are in the redundant form. The scenario 830 is similar to the representation illustrated in FIG. 7C. The operations corresponding to the instructions in the scenario 820, 825 and 830 can be executed in one cycle using the method illustrated in FIG. 7D. It would be appreciated by on skilled in the art that the dependency chain can be formed with two or more operations using the method described. For example, as long as the current instruction can operate with the input operand in the redundant form and as long as the previous instruction in the dependency chain can generate the result in the redundancy form, the dependency chain can continue to grow. In one embodiment, when the previous instruction in the dependency chain is the type of instruction that generate its result in the conventional form, then the dependency chain may end at the previous instruction. In another embodiment, the current instruction can be used to start another dependency chain using the same redundant operand requirement discussed above.

Figure 9A:
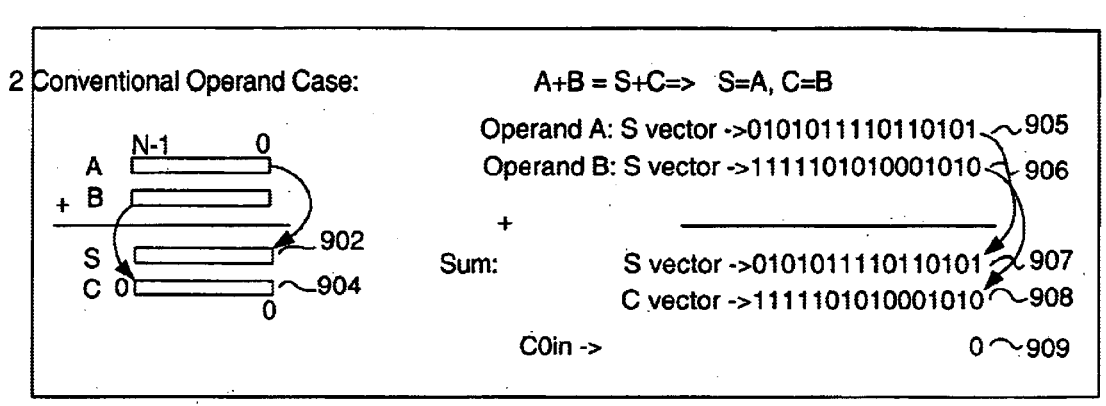
FIGS. 9A, 9B, 9C and 9D illustrate exemplary addition operations using the extended carry save format.

For each addition operation, there are four possible different combinations of input operands. For example, the input operands can be two conventional input operands, one conventional input operand and one redundant input operand, one redundant input operand and one conventional input operand, and two redundant input operands. FIG. 9A illustrates an exemplary addition operation with two conventional input operands using the extended carry save format. The redundant adder/subtractor comprises of a chain of 42 compressors as illustrated in FIG. 7D. In one embodiment, for all add operations, the $C_{0in}$ bit is set to zero. When the two input operands are in the conventional form, the first and second input operands are mapped directly to the sum vector 902 and the carry vector 904 of the result in the redundant form. The exemplary bit representations of the two input operands 905, 906 and the respective bit representations of the sum vector 907 and the carry vector 908 are shown on the right of FIG. 9A. The $C_{0in}$ bit 909 in the extended carry save representation is set to zero for the add operation.

Figure 9B:
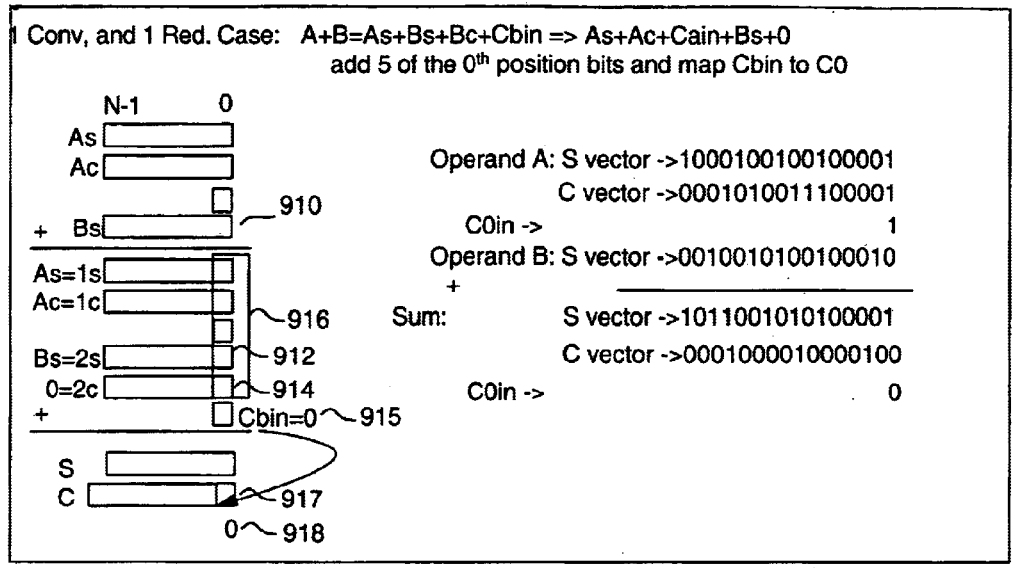

FIG. 9B illustrates an exemplary addition operation with one redundant input operand and one conventional input operand using the 4-2 compressor illustrated in FIG. 7D and the extended carry save format. In this example, the first input operand is in the redundant form and the second input operand is in the conventional form. The conventional input operand 910 is mapped to the input of the adder with its value in the sum vector 912. The associated carry vector 914 has all the bits set to zero. The $C_{0in}$ bit 915 for this second input operand 910 is set to zero. Generally, at every bit position, four bits can be added. However, for the right most bit position shown the by enclosing rectangle 916, five bits are added, including the $C_{0in}$ bit of the redundant form input operand using the extended carry save format. In one embodiment, the $C_{0in}$ bit 915 is mapped to the zero position 917 in the carry vector of the result. As for all add operations using the extended carry save format, the extra bit 918 of the result is set to zero. The exemplary bit representations of the two input operands and the respective bit representations of the sum vector and the carry vector are shown on the right of FIG. 9B. Only the sum vector bit representation is shown for the second input operand because the associated carry vector bit representation is all zero.

Figure 9C:
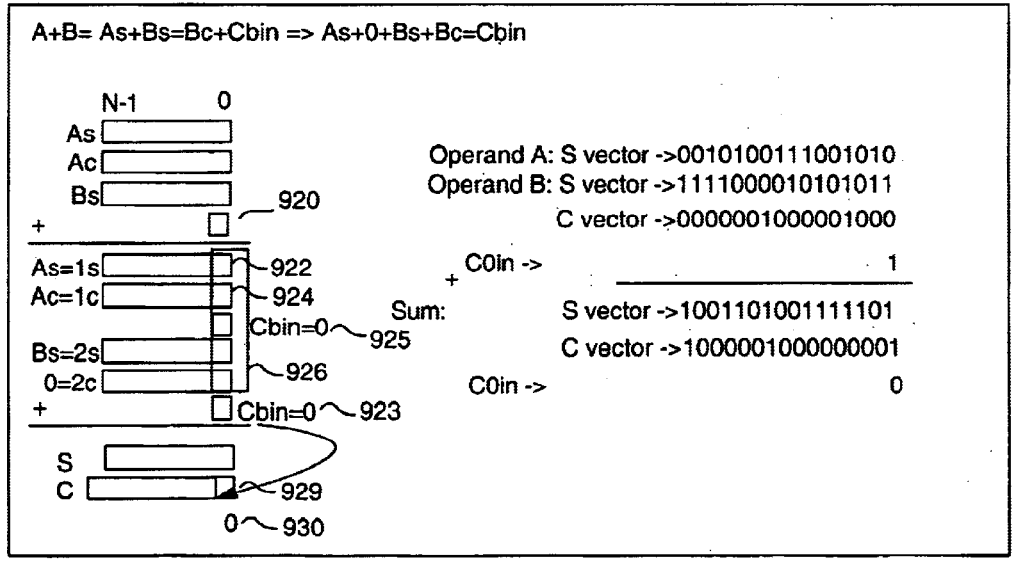

FIG. 9C illustrates another exemplary addition operation with one redundant input operand and one conventional input operand using the 4-2 compressor of FIG. 7D and the extended carry save format. In this example, the first input operand is in the conventional form and the second input operand is in the redundant form. The conventional input operand 920 is mapped to the input of the adder with its value in the sum vector 922. The bits in the carry vector 924 are set to zero. The $C_{0in}$ bit 925 for this first input operand is set to zero. The five bits in the zero position shown by the enclosing rectangle 926 are added together. The other bit positions of the input operands have four bits to be added. The result of the add operation is stored in the sum vector and the carry vector of the result. The $C_{0in}$ bit 928 of the second input operand is mapped to the zero position 929 in the carry vector of the result. Since this is an add operation, the extra bit 930 of the result is set to zero. The exemplary bit representations of the two input operands and the respective bit representations of the sum vector and the carry vector are shown on the right of FIG. 9C. Only the sum vector bit representation is shown for the first input operand because the associated carry vector bit representation is all zero.

Figure 9D:
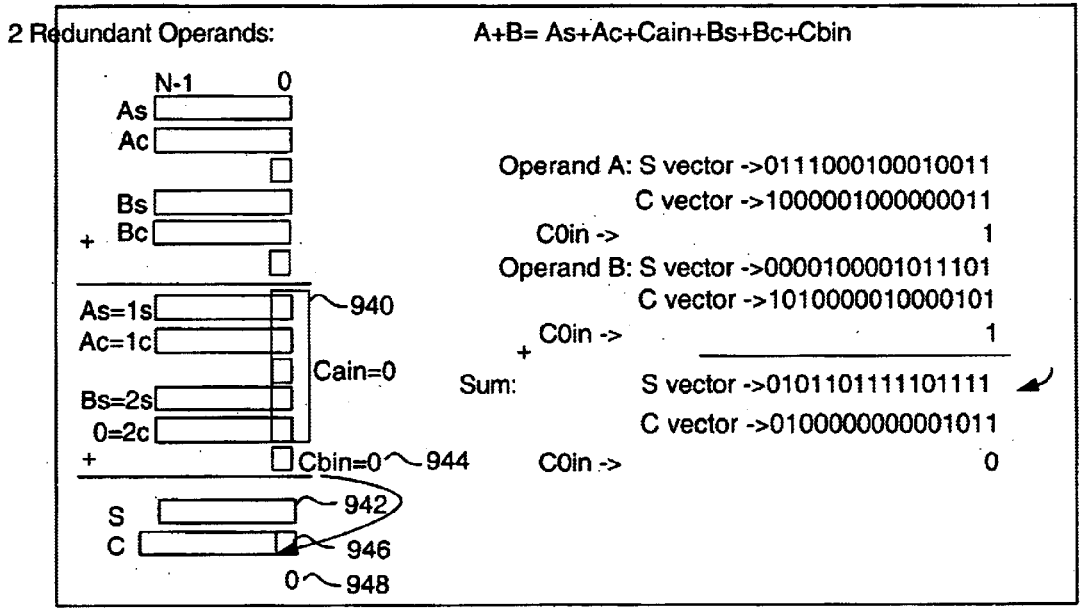

FIG. 9D illustrates an exemplary addition operation with two redundant input operands using the 4-2 compressor illustrated in FIG. 7D and the extended carry save format. The five bits in the zero position enclosed by the rectangle 940 are added and the sum is stored in the zero position of the sum vector 942. The $C_{0in}$ bit 944 of the second input operand is mapped to the zero position 946 in the carry vector of the result. Since this is an add operation, the extra bit 948 of the result is set to zero. The exemplary bit representations of the two input operands and the respective bit representations of the sum vector and the carry vector are shown on the right of FIG. 9D.

Figure 10A:
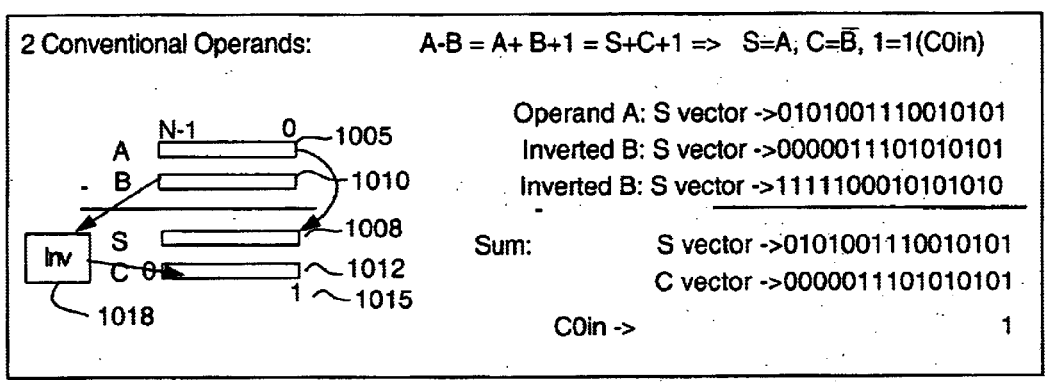

For subtract operation, generally the second input operand is inverted, a 1 is added, and the subtract operation is changed to an add operation. The inversion of the second operand requires changing every bit in the second input operand from a 1 to a 0 and from a 0 to a 1. For example, the subtraction A−B is equivalent to A+(invert B+1). FIG. 10A illustrates an exemplary subtraction operation with two conventional input operands using the 4-2 compressor illustrated in FIG. 7D and the extended carry save format. In one embodiment, the first input operand 1005 is mapped to the sum vector 1008 of the result. The second input operand 1010 is inverted and then mapped to the carry vector 1012 of the result. For the subtract operation, the $C_{0in}$ bit 1015 is set to 1. There is no computation performed in this operation except for small delay of the inverter 1018. The exemplary bit representations of the two input operands and the respective bit representations of the sum vector and the carry vector are shown on the right of FIG. 10A.

Figure 10B:
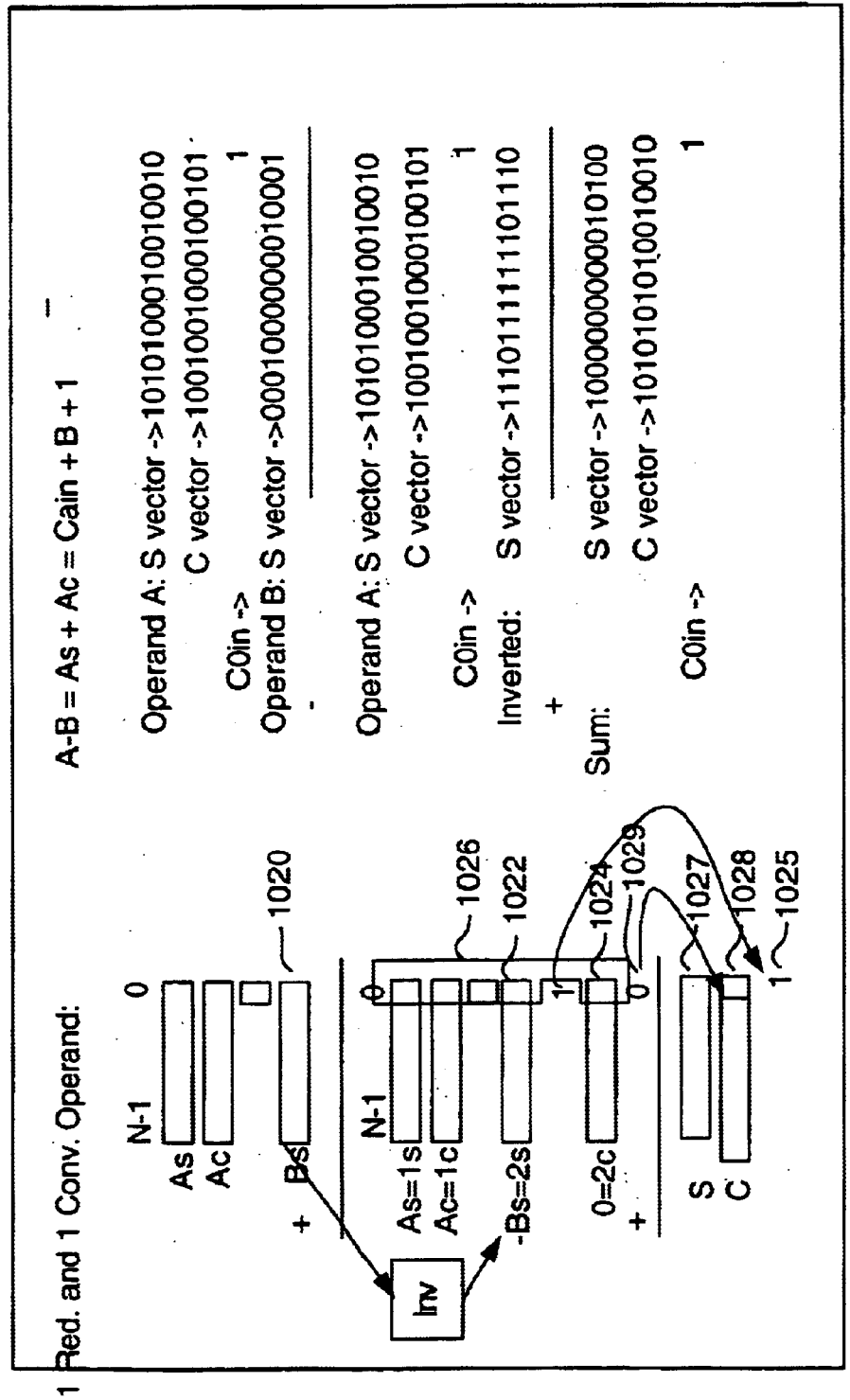

FIG. 10B illustrates an exemplary subtraction operation with one redundant input operand and one conventional input operand using the 4-2 compressor illustrated in FIG. 7D and the extended carry save format. In this example, the first input operand is in redundant form and the second input operand is in the conventional form. The sum vector 1022 contains the inverted bits from the bit vector 1020. Instead of adding a 1 to the zero bit position of the sum vector, the 1 is inserted into the $C_{0in}$ bit 1025 of the result. The five bits in the zero position shown by the enclosing rectangle 1026 are added together. The other bit positions of the input operands have four bits to be added. The result of the add operation is stored in the sum vector 1027 and the carry vector 1028. The $C_{0in}$ bit 1029 of the second input operand is mapped to the zero position in the carry vector 1028 of the result. The exemplary bit representations of the two input operands and the respective bit representations of the sum vector and the carry vector are shown on the right of FIG. 10B. Only the sum vector bit representation is shown for the second input operand because the associated carry vector bit representation is all zero. Note that for subtract operation, the $C_{0in}$ bit 1025 of the result is a 1.

Figure 10C:
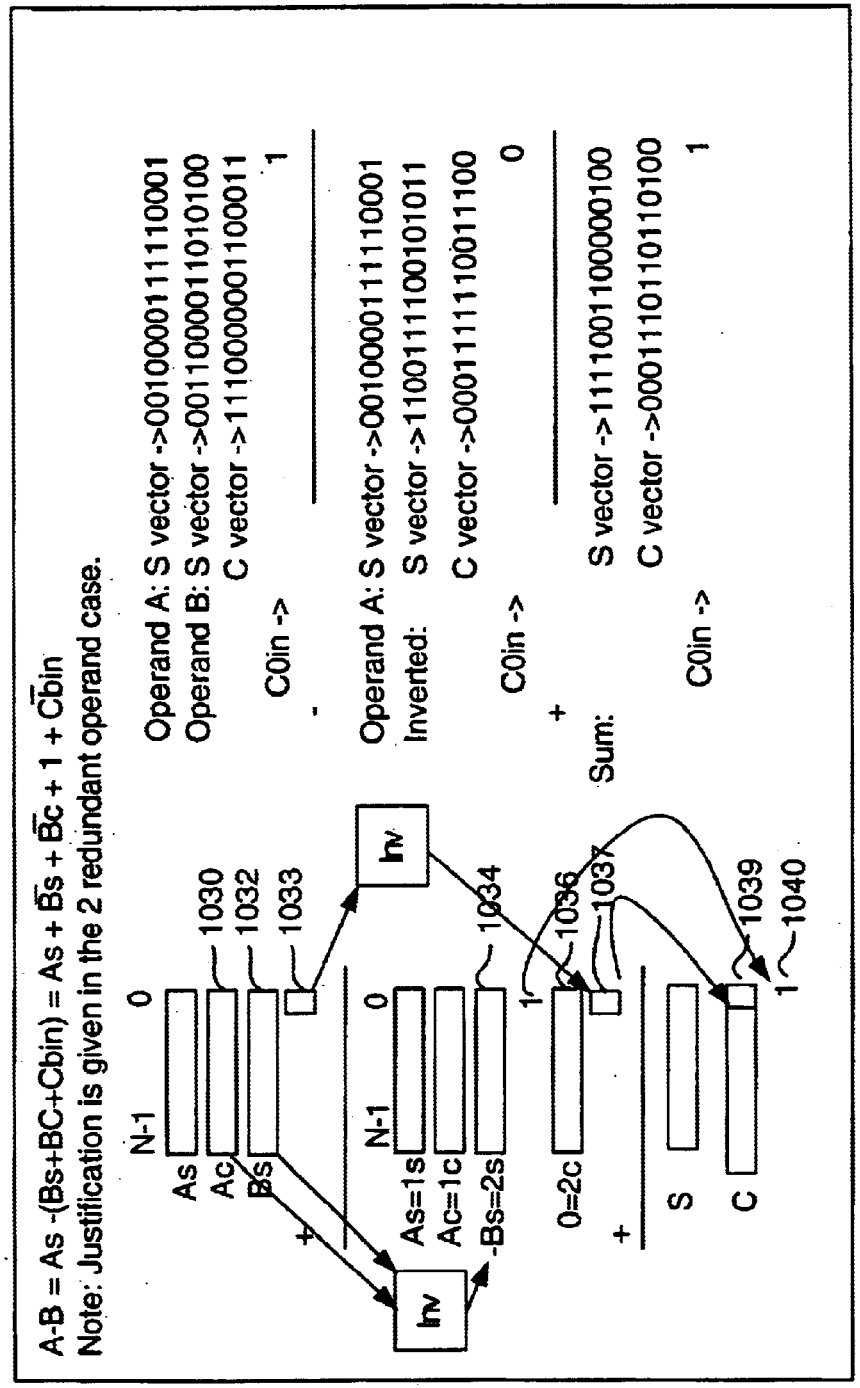
Figure 10C:
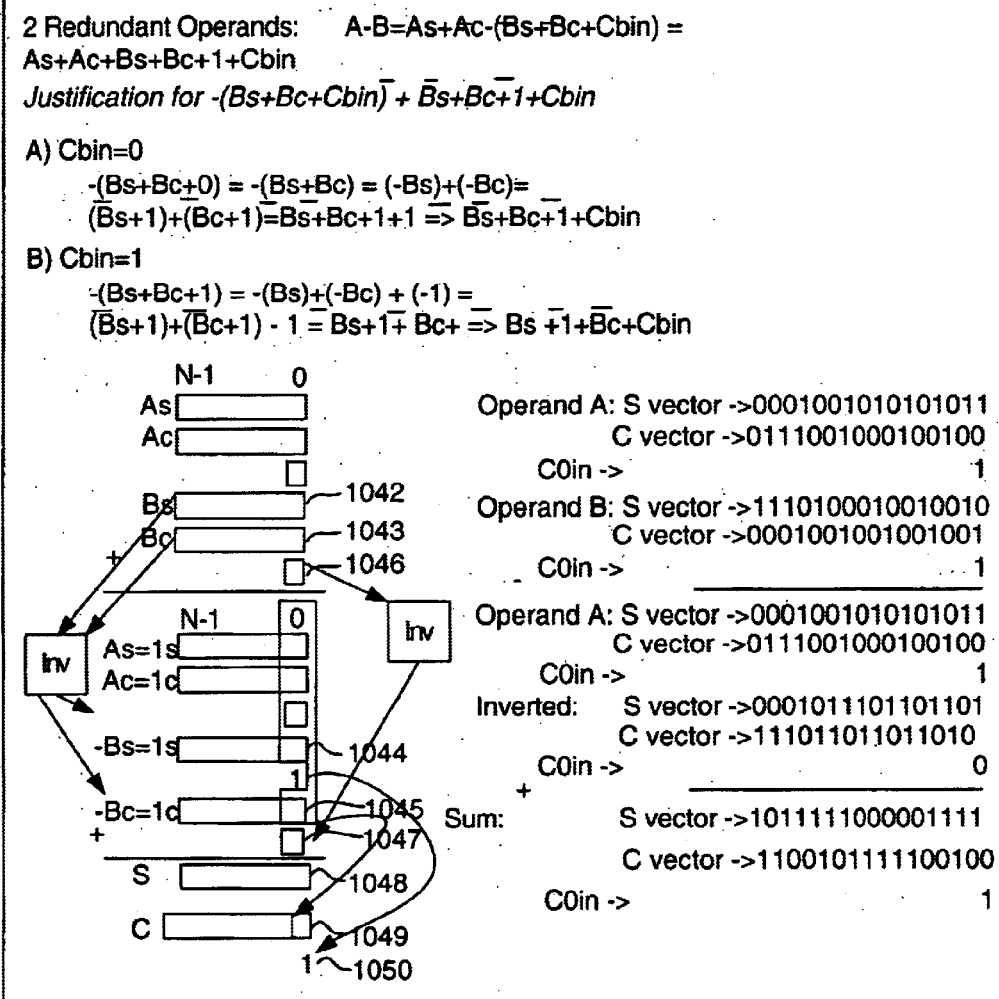

FIG. 10C illustrates another exemplary subtraction operation with one redundant input operand and one conventional input operand using the extended carry save format. In this example, the first input operand is in the conventional form and the second input operand is in redundant form. With the second input operand in the redundant form, the following equivalence equations, where A is the first input operand in the conventional form and B is the second input operand in the redundant form, are observed.

$$A-B = A - (B_s + B_c + C_{bin}) = A + \bar{B}_s + \bar{B}_c + 1 + \bar{C}_{bin}$$

where, when $C_{bin} = 0$ $$-(B_s + B_c + 0) = -(B_s + B_c) = (-B_s) + (-B_c)$$
$$= (\bar{B}_s + 1) + (\bar{B}_c + 1)$$
$$= \bar{B}_s + \bar{B}_c + 1 + 1 \Rightarrow \bar{B}_s + \bar{B}_c + 1 + \bar{C}_{bin}$$

when $C_{bin} = 1$ $$-(B_s + B_c + 1) = (-B_s) + (-B_c) + (-1)$$
$$= (\bar{B}_s + 1) + (\bar{B}_c + 1) - 1$$
$$= \bar{B}_s + 1 + \bar{B}_c \Rightarrow \bar{B}_s + 1 + \bar{B}_c + \bar{C}_{bin}$$

where $B_s$ and $B_c$ are the sum vector and the carry vector for the second input operand and the $C_{bin}$ is the extra bit in the extended carry save format. In one embodiment, both of the sum vector 1030 and the carry vector 1032 associated with the second input operand are inverted into vectors 1034 and 1036. Instead of adding a 1 to the zero bit position of the inverted sum vector 1034, the 1 is inserted into the $C_{0in}$ bit 1040 of the result. The $C_{0in}$ bit 1033 of the second input operand is inverted and inserted in the $C_{0in}$ bit 1039. The exemplary bit representations of the two input operands and the respective bit representations of the sum vector and the carry vector are shown on the right of FIG. 10C. Note that for subtract operation, the $C_{0in}$ bit 1040 of the result is a 1.

FIG. 10D illustrates an exemplary subtraction operation with two redundant input operands using the extended carry save format. The sum vector 1042 and the carry vector 1043 of the second input operand are inverted into vectors 1044 and 1045. Instead of adding a 1 to the zero bit position of the inverted sum vector 1044, the 1 is inserted into the $C_{0in}$ bit 1050 of the result. The $C_{0in}$ bit 1046 of the second input operand is inverted and inserted in the $C_{0in}$ bit 1047. An add operation is performed and the result is stored in the sum vector 1048 and the carry vector 1049. The $C_{0in}$ bit 1047 is then copied to the zero bit position in the carry vector 1049 of the result. The exemplary bit representations of the two input operands and the respective bit representations of the sum vector and the carry vector are shown on the right of FIG. 10D. Note that the justification for the inversion of the sum vector and the carry vector associated with the second operand is shown at the top of FIG. 10D. Consistent with the previous exemplary subtract operations, the $C_{0in}$ bit 1050 of the result is a 1. Because of the inversion of the input operand, the inverter delay for the subtract operations may need to be hidden to provide for zero cycle direct mapping.

It would be appreciated by one skilled in the art that the redundant operands can also be used in executing other operations, such as, for example, compare, shift, etc, without departing from the scope of the invention. For example, to do comparisons of two input operands, the redundant subtract operation is first performed. Then, zero detection logic and conversion are applied. Conversion is needed to produce the sign bit of the redundant operands and the result of the subtraction.

Figure 11:
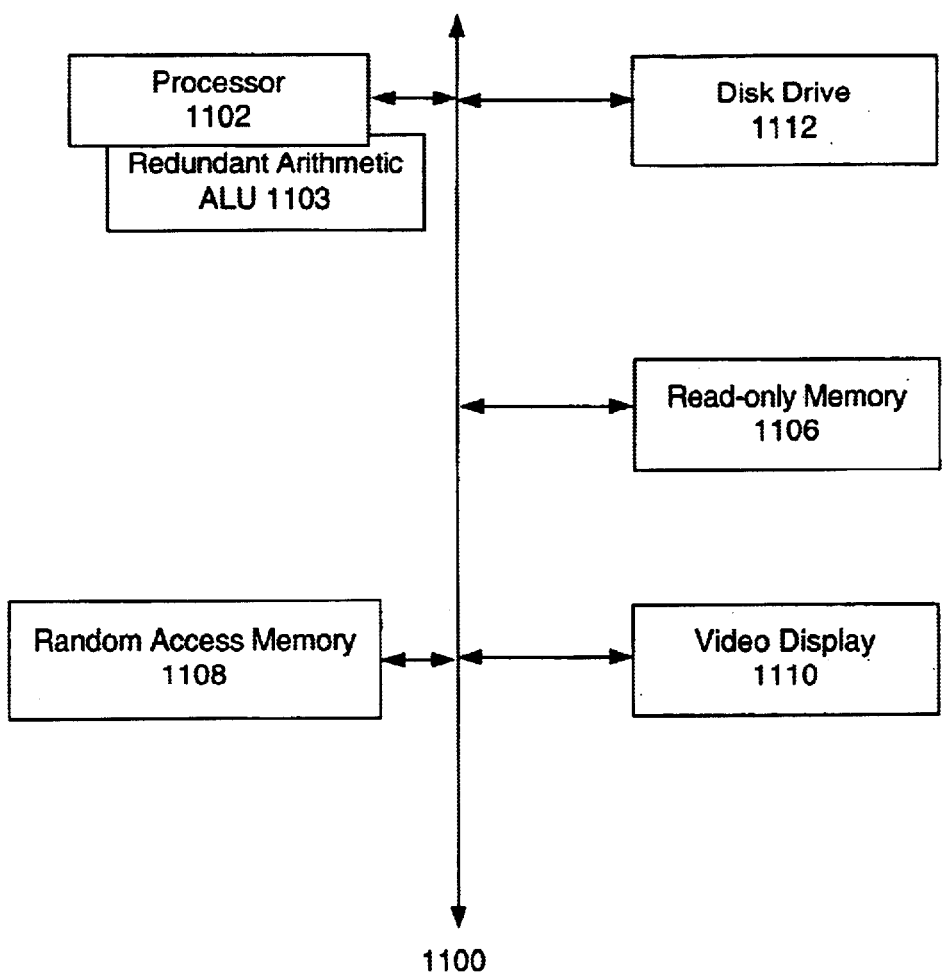
FIG. 11 illustrates an exemplary computer system that can be used with the technique disclosed.

FIG. 11 illustrates an embodiment of a computer system that can be used with the present invention. The various components shown in FIG. 11 are provided by way of example. Certain components of the computer in FIG. 11 can be deleted from the addressing system for a particular implementation of the invention. The computer shown in FIG. 11 may be any type of computer including a general-purpose computer.

FIG. 11 illustrates a system bus 1100 to which various components are coupled. A processor 1102 performs the processing tasks required by the computer. The processor 1102 may be any type of processing device capable of implementing the blocks necessary to perform the addressing and delivery operations discussed above. In one embodiment, the processor 1102 comprises of an arithmetic logic unit (ALU) 1103 implemented to perform redundant arithmetic operations. A read-only memory (ROM) 1106 and a random access memory (RAM) 1108 are coupled to bus 1100 and provide a storage mechanism for various data and information used by the computer. Although ROM 1106 and RAM 1108 are shown coupled to bus 1100, in alternate embodiments, ROM 1106 and RAM 1108 are coupled directly to processor 1102 or coupled to a dedicated memory bus (not shown). In one embodiment, the ROM 1106 may comprise code to monitor the execution sequence of instructions processed by the processor 1102. The ROM 1106 may also comprise code to form dependency chains using the execution sequence information and the redundant arithmetic information. In another embodiment, the monitoring function and the dependency chain formation function may be implemented in hardware logic. A video display 1110 is coupled to bus 1100 and displays various information and data to the user of the computer. A disk drive 1112 is coupled to bus 1100 and provides for the long-term mass storage of information. Disk drive 1112 may be used to store various profile data sets and other data generated by and used by the addressing and delivery system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method for implementing redundant arithmetic, comprising:
    forming a chain of instructions, the chain of instructions comprising a first instruction and a second instruction from a group of instructions, wherein a result of the first instruction is an input of the second instruction, the second instruction accepting a redundant form of the result of the first instruction without having to convert the result into a conventional form, the second instruction further accepting one or more input in the conventional form in addition to the input in the redundant form; and
    executing the instructions in the chain of instructions in an instruction pipeline different from instruction pipelines associated with instructions not in the chain of instructions.

2. The method of claim 1, wherein the redundant form comprises two bit vectors and the conventional form comprises one bit vector.

3. The method of claim 2, wherein the two bit vectors in the redundant form comprises a sum vector and a carry vector.

4. The method of claim 2, wherein an instruction at top of the chain of instructions accepts all of its input in the conventional form, and wherein an instruction at bottom of the chain of instructions generates its result in the conventional form.

5. A computer system, comprising:
    a processor to receive instructions which, when executed by the processor, cause the processor to perform a method for implementing redundant arithmetic comprising:
        forming a chain of instructions, the chain of instructions comprising a first instruction and a second instruction from a group of instructions, wherein the group of instructions is to execute in a predetermined execution sequence, wherein a result of the first instruction is an input of the second instruction, the second instruction accepting a redundant form of the result of the first instruction without having to convert the result into a conventional form, the second instruction further accepting one or more inputs in the conventional form in addition to the input in the redundant form; and
    executing the instructions in the chain of instructions not in the predetermined execution sequence.

6. The computer system of claim 5, wherein the redundant form comprises two bit vectors and the conventional form comprises one bit vector.

7. The computer system of claim 6, wherein the two bit vectors in the redundant form comprises a sum vector and a carry vector.

8. The computer system of claim 6, wherein an instruction at top of the chain accepts all of its input in the conventional form, and wherein an instruction at bottom of the chain generates its result in the conventional form.

9. An article of manufacture, comprising:
    a machine-accessible medium including data that, when accessed by a machine, cause the machine to performs operations for implementing redundant arithmetic comprising:
        forming a chain of instructions, the chain comprising a first instruction and a second instruction, wherein a result of the first instruction is an input of the second instruction, the second instruction accepting redundant form of the result of the first instruction without having to convert the result into a conventional form, the second instruction further accepting one or more inputs in the conventional form in addition to the input in the redundant form.

10. The article of manufacture of claim 9, wherein the redundant form comprises two bit vectors and the conventional form comprises one bit vector.

11. The article of manufacture of claim 10, wherein the two bit vectors in the redundant form comprises a sum vector and a carry vector.

12. The article of manufacture of claim 9, wherein an instruction at top of the chain accepts all of its input in the conventional form.

13. The article of manufacture of claim 9, wherein an instruction at bottom of the chain generates its result in the conventional form.

14. The article of manufacture of claim 9, further comprising:

capturing dependency information between the first instruction and the second instruction, the dependency information used to form the chain of instructions.

15. The article of manufacture of claim 14, wherein the dependency information includes information indicating one instruction using a result of another instruction as its input.

* * * * *

UNITED STATES PATENT AND TRADEMARK OFFICE
CERTIFICATE OF CORRECTION

PATENT NO. : 6,848,043 B1
DATED : January 25, 2005
INVENTOR(S) : Yeh et al.

Page 1 of 1

It is certified that error appears in the above-identified patent and that said Letters Patent is hereby corrected as shown below:

Column 7,
Line 3, delete "$2^3 2^2 2^1 2^0$" and insert -- $2^3 2^2 2^1 2^0$ --.
Line 5, delete "$2^3 A^3 + 2^2 A^2 2^1 A^1 + 2^0 A^0$" and insert -- $2^3 A^3 + 2^2 A^2 + 2^1 A^1 + 2^0 A^0$ --.

Column 9,
Line 15, delete "803" and insert -- 805 --.

Signed and Sealed this

Fourth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,848,043 B1 Page 1 of 1
APPLICATION NO. : 09/561261
DATED : January 25, 2005
INVENTOR(S) : Yeh et al.

It is certified that error appears in the above-identified patent and that said Letters Patent is hereby corrected as shown below:

Column 7,
Line 29, delete "C" and insert -- $C_0$ --.

Signed and Sealed this

Fourth Day of July, 2006

JON W. DUDAS
*Director of the United States Patent and Trademark Office*